(12) United States Patent
Berger et al.

(10) Patent No.: US 7,998,911 B1
(45) Date of Patent: Aug. 16, 2011

(54) ENVIRONMENTAL FRIENDLY FRACTURING AND STIMULATION COMPOSITION AND METHOD OF USING THE SAME

(75) Inventors: Paul Daniel Berger, Sugar Land, TX (US); Christie Huimin Berger, Sugar Land, TX (US)

(73) Assignee: Oil Chem Technologies, Sugar Land, TX (US)

( * ) Notice: Subject to any disclaimer, the term of this patent is extended or adjusted under 35 U.S.C. 154(b) by 0 days.

(21) Appl. No.: 12/930,721

(22) Filed: Jan. 15, 2011

Related U.S. Application Data

(60) Provisional application No. 61/339,291, filed on Mar. 2, 2010.

(51) Int. Cl.
*C09K 8/60* (2006.01)
*C09K 8/68* (2006.01)

(52) U.S. Cl. ........ 507/267; 507/203; 507/905; 507/922; 516/198; 516/204; 516/917

(58) Field of Classification Search .................. 507/267, 507/203, 905, 922; 516/198, 204, 917
See application file for complete search history.

(56) References Cited

U.S. PATENT DOCUMENTS

| 3,454,095 | A | * | 7/1969 | Webster et al. ............... 166/303 |
| 7,380,606 | B2 | | 6/2008 | Pursley et al. | |

OTHER PUBLICATIONS

Kang-Lyung, Abstract of: Determination of low molecular weight alcohols including fusel oil in various samples by diethyl ether extraction and capillary gas chromatography, Journal of the AOAC International, 2005, vol. 88, No. 5, pp. 1419-1427.*

49 CFR 382.107 Definitions, No Date.*
Definition of Fatty Acid, Oxford Dictionarty of Chemistry, http://www.answers.com/topic/fatty-acid#ixzzIM5D5VtHc, No Date.*
Page for Organic Acid, Wikipedia, the free encyclopedia, No Date.*
Christian Hallman, Ben G.K. van Aarssen, Klitie Grice, Relative efficiency of free fatty acid butyl esterification Choice of catalyst and derivatisation procedure, Journal of Chromatography A, 1198-1199 (2008) 14-20.*
Jiuyu Li, Renkou Xu, Diwakar Tiwari and Guoliang Ji, English language abstract of: Effect of low-molecular-weight organic acids on the distribution of mobilized Al between soil soultion and solid phase, Zeitschrift fur Pflanzenernahrung and Bodenkunde, 1990 vol. 153 No. 3 pp. 201-205.*
McBride, Robert, Mikkelsen, Robert L., Barker, Kenneth R., Abstract to: The role of low molecular weight organic acids from decomposing rye in inhibiting root-knot nematode populations in soil, Applied Soil Ecology, 2000, vol. 15 No. 3 pp. 243-251.*
Masayuki Tani, Kayoko Shinjo Shida, Kiyoshi Tsutsuki and Renzo Kondo, Determination of Water-Soluble Low-Molecular-Weight Organic Acids in Soils by Ion Chromatography, Soil Sci. Plant Nutr., 47 (2), 387-397, 2001.*
Howard et al., Comparison of Flow Back Aids SPE 122307 Society of Petroleum Engineers, May 2009.
Panga et al., Wettability Alteration . . . SPE 100182 Society of Petroleum Engineers, Jun. 2006.
Penny and Pursley, Field Studies of Drilling . . . SPE 107844 Society of Petroleum Engineers, May 2007.

* cited by examiner

*Primary Examiner* — Timothy J. Kugel

(57) ABSTRACT

A non-toxic, environmentally friendly, green flowback aid is disclosed that reduces water blockage when injected into a fractured reservoir. The composition includes an water soluble ester of a low molecular weight alcohol and a low molecular weight organic acid, an oil soluble ester of a low molecular weight alcohol and a high molecular weight fatty acid, one or more water soluble or dispersible nonionic surfactant(s) derived from vegetable or animal sources, one or more anionic or amphoteric surfactant(s) derived from animal or vegetable based sources, and, water. Compositions for low temperature applications are also disclosed that can remain fluid down to −41° F.

15 Claims, 2 Drawing Sheets

Figure 1:
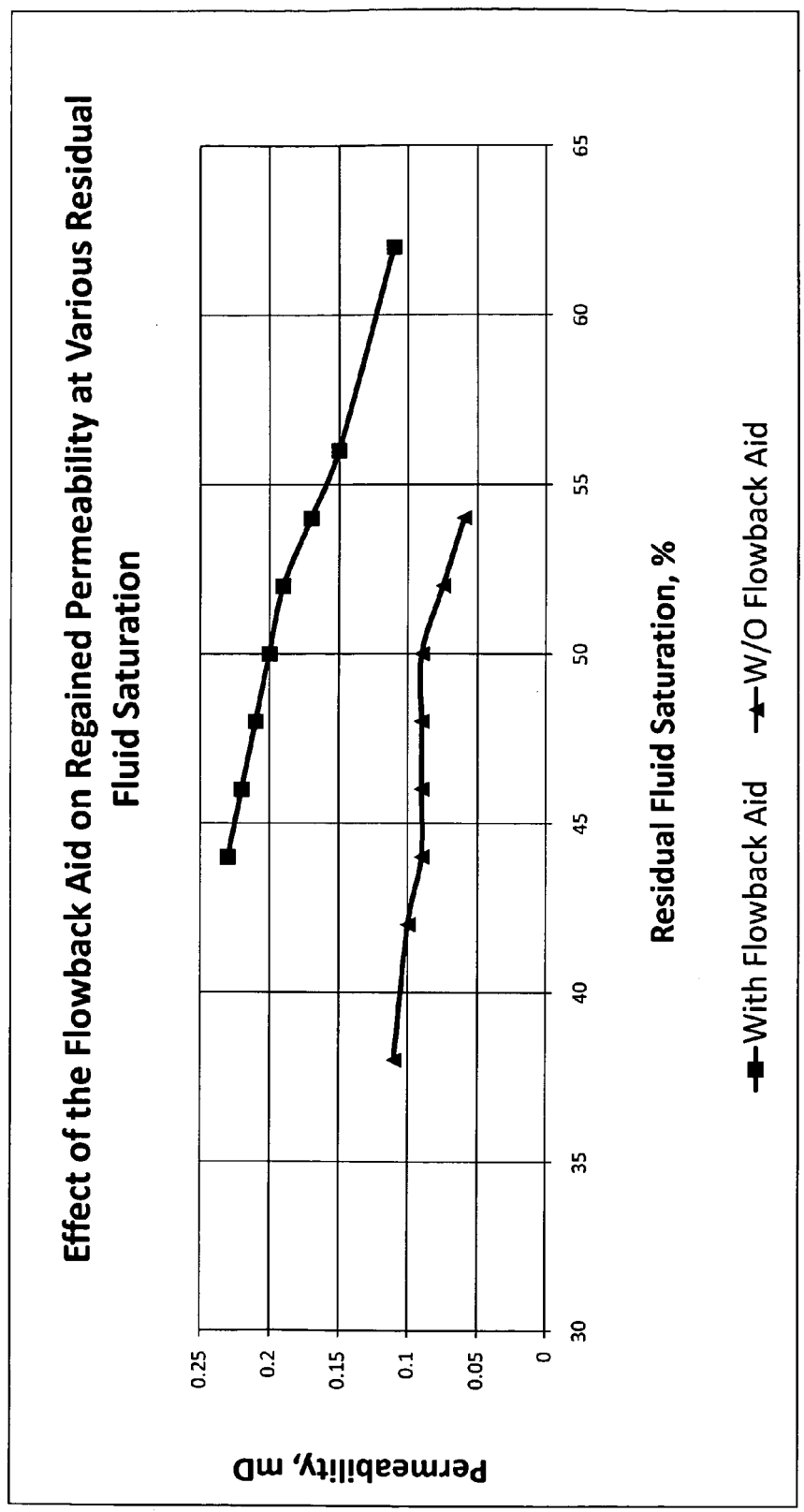

ENVIRONMENTAL FRIENDLY FRACTURING AND STIMULATION COMPOSITION AND METHOD OF USING THE SAME

CROSS REFERENCE TO RELATED APPLICATIONS

This application claims the benefit of provisional application Ser. No. 61/339,291, filed on Mar. 2, 2010.

STATEMENT REGARDING FEDERALLY SPONSORED RESEARCH OR DEVELOPMENT

Not Applicable

BACKGROUND OF THE INVENTION

This invention involves compositions and a process for drilling or stimulating of subterranean reservoirs including but not restricted to shale, tight gas, coal, conventional and non-conventional reservoirs. The composition of this invention is composed of ingredients that are considered to be non-toxic, biodegradable and derived from "green" or renewable resources.

The growing need for oil coupled with the decline in primary production of oil has required the need for more novel and efficient methods of recovering residual oil. These methods are generally referred to as improved oil recovery (IOR) or well stimulation. Many flow back aids have been developed and discussed in the prior art to help recover injected fluids after fracturing. The flow back aids benefits the production by reducing damage due to phase trapping, enhance mobilization of the oil and gas, help to increase the regained permeability and improve the oil/gas recovery. Flow back aid formulations generally include one or more anionic, nonionic or amphoterics surfactants, along with solvents and co-surfactant that are in the solution or microemulsion form. The various flowback aids are discussed by Howard et al. in SPE paper 122307. Also Panga, et al. discusses the wettability alteration in SPE 100182. Pursley et al. U.S. Pat. No. 7,380,606 discloses a microemulsion well treatment formed by combining a solvent-surfactant blend with a carrier fluid. In the preferred embodiments, the solvent-surfactant blend includes a surfactant and a solvent selected from the group consisting of terpenes and alkyl or aryl esters of short chain alcohols. Surfactants include ethoxylated castor oil, polyoxyethylene sorbitan monopalmitate and polyethylene glycol. Additionally, Isopropyl alcohol and triethylene glycol are used in some cases. Penny and Pursley in SPE 107844 give field and laboratory data supporting the effectiveness of microemulsions in low perm shales, coalbed methane and tight sandstone reservoirs.

BRIEF SUMMARY OF THE INVENTION

The primary object of the invention is to provide a flowback aid formulation based entirely on non-toxic, readily available, biodegradable, green ingredients having performance of superior performance to the formulations disclosed in the prior art. Another object of the present invention is to provide a flowback formulation suitable for application under conditions of extremely low temperatures that are sometimes encountered during the fracturing of reservoirs.

Other objects and advantages of the present invention will become apparent from the following descriptions, wherein, by way of illustration and example, an embodiment of the present invention is disclosed.

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

The environmentally safe, green, non-toxic flowback aid composition of the present invention derived from renewable resources includes:
 a. one or more water soluble esters of a low molecular weight alcohol and a low molecular weight organic acid,
 b. One or more oil soluble esters of a low molecular weight alcohol and a high molecular weight fatty acid,
 c. one or more water soluble or dispersible nonionic surfactant(s) derived from vegetable or animal sources,
 d. one or more anionic or amphoteric surfactant(s) derived from animal or vegetable based sources, and,
 e. water.

Examples of the water soluble esters derived from low molecular weight alcohol and low molecular weight organic acid include but are not restricted to ethyl acetate, propyl acetate, butyl acetate, ethyl lactate, methyl lactate, propyl lactate, methyl succinate, ethyl succinate.

Examples of the oil soluble esters of low molecular weight alcohols and high molecular weight fatty acids include but are not restricted to, methyl laurate, ethyl laurate, methyl laurate, propyl laurate, methyl oleate, ethyl oleate, propyl oleate, methyl racinoleate, ethyl racinoleate, propyl racinoleate, methyl soyate, ethyl soyate, propyl soyate, methyl cocoate, ethyl cocoate, propyl cocoate, methyl erucate, ethyl erucate, propyl erucate. Examples of water soluble or dispersible nonionic surfactants derived from vegetable or animal sources include but are not restricted to oxirane or methyl oxirane or mixtures of oxirane and methyl oxirane derivatives of lauryl alcohol, myristyl alcohol, palmityl alcohol, stearyl, oleyl alcohol, erucyl alcohol, polyglucosides.

Examples of anionic or amphoteric surfactants derived from animal or vegetable sources include but are not restricted to sodium lauryl sulfate, sodium lauryl ether sulfates, sodium octyl sulfosuccinate, di sodium octyl sulfosuccinates, sodium oleyl ether carboxylates, sodium lauryl carboxylates, cocoamidopropyl betaine, cocodimethyl betaine, oleylamidopropyl betaine, oleyl dimethyl betaine, erucylamidopropyl betaine, erucyldimethyl betaine, lauryl amine oxide, myristyl amine oxide, oleyl amine oxide, erucyl amine oxide.

The composition of the present invention is prepared by combining 5-25 wt % of the water soluble ester, 5-25 wt % of the oil soluble ester, 5-25 wt % of the water soluble or dispersible nonionic surfactant, 5-25 wt % of the anionic or amphoteric surfactant with the remainder being water. Glycerin and other environmentally friendly, green compounds including but not limited to polyglycerin, inorganic salts, polyglycerol esters may be added to lower the freezing point of the composition when necessary. The composition is added to a fracturing formulation at concentrations of 0.1 to 5 gallons per 1000 gallons of injection fluid depending on reservoir conditions to obtain the desired flowback performance.

The present invention also involves a process for conventional and non-conventional applications using the compositions above including but are not limited to drilling or stimulation of subterranean reservoirs including but not restricted to shale, tight gas, or coal. The composition of the present invention is used at 0.1 to 5 gallons per thousand gallons of injected water. The injected water may be fresh water, produced water, KCl solution, NaCl solution, Acid Solution or the combination of two or more of these. In general any aqueous liquid used for fracturing may be employed. The composition of this invention is added to the water or injection brine and injected into the formation to reduce surface tension and/or increase contact angle allowing enhanced fluid recovery during fracturing or stimulation processes. The injection fluid may contain, in addition to the composition of the instantaneous invention, other ingredients known to those familiar with the art including but not restricted to corrosion inhibitors, acids, dispersants, viscosifiers, lubricity agents.

Employing the composition of the instantaneous invention improves penetration into the reservoir, allows better flowback and drainage, improves load recovery, reduces damage due to phase trapping, in addition to providing a safe, environmentally friendly alternative to existing flowback aids. Other applications of the formulation of the instantaneous invention include Enhanced Oil Recovery (EOR), wettability alteration, well cleanout and work-over.

LIST OF FIGURES

FIG. 1 Effect of the flowback aid on regained permeability at various residual fluid saturation.

Figure 2:
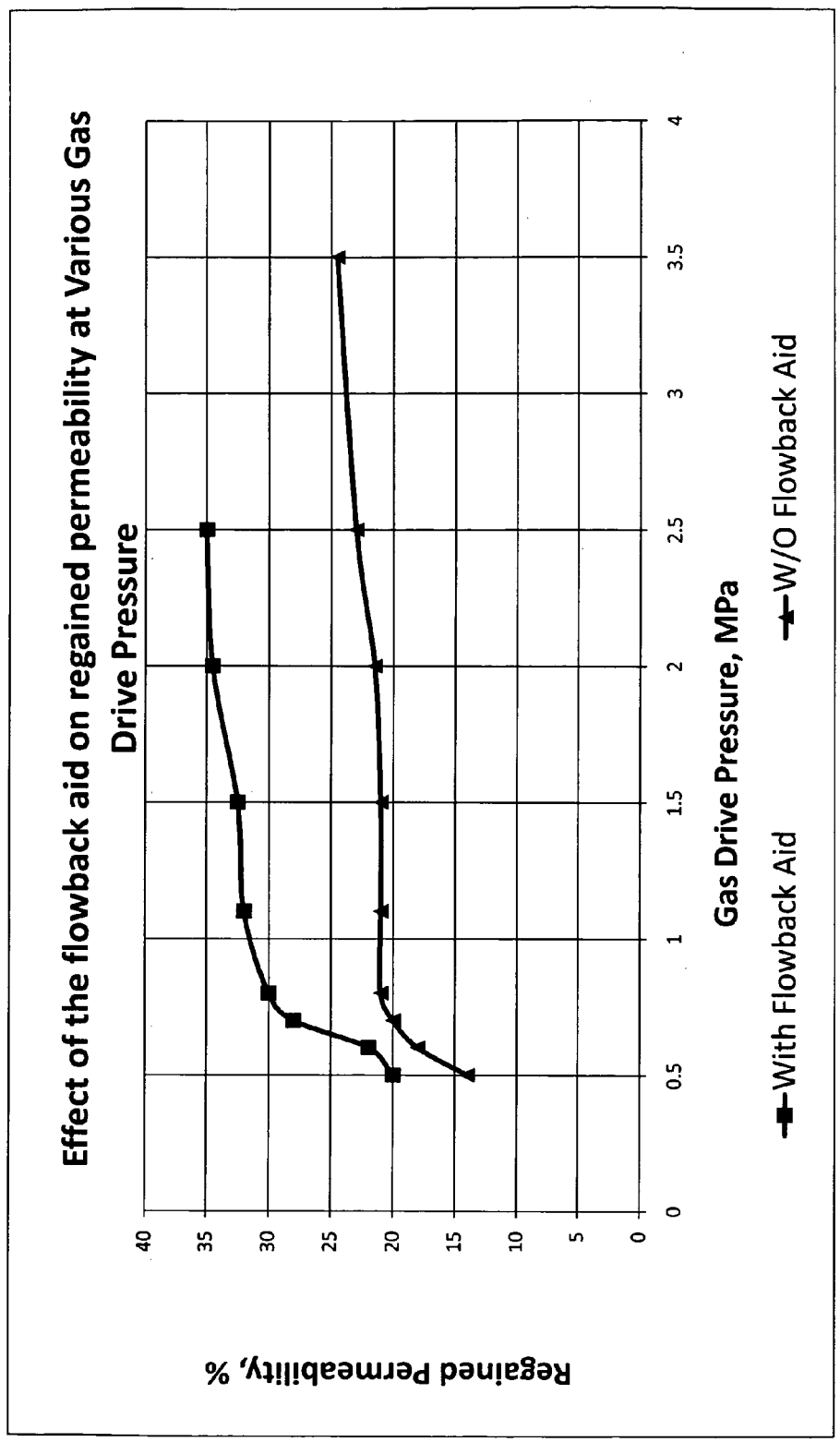

FIG. 2 Effect of the flowback aid on regained permeability at various gas drive pressure The following examples serve to demonstrate the effectiveness of the invention over the prior art.

Example 1

Preparation of the Flow-Back Aid (Sample 12-8816)

An environmentally safe, green, non-toxic flowback aid was prepared by first dissolving 15 parts of ethyl lactate in 15 parts of methyl tallate. A second solution was prepared by mixing 12.5 parts of lauryl alcohol containing 6 moles of ethylene oxide with a 12.5 parts of a 70% aqueous solution of mono-sodium dodecyl sulfosuccinate. The two solutions were combined with stirring and 55 parts of water was slowly added to form a clear low viscosity stable solution.

Example 2

Performance Test

This test was performed to compare the ability of various flowback aids to not form stable emulsions when contacted with residual oil. Various flowback aids were mixed at a dosage of one gallon per 1000 gallons of injection brine. 50 ml of brine containing the flowback aid was mixed with 50 ml of oil and blended at high speed in a Waring Blender to emulsify the two liquids. After 5 minutes of mixing the liquid was poured into a 500 ml cylinder to observe the water break out from the emulsion. The API standard for this test is for 95% of the water to breakout in 30 minutes. Table 1 shows the results using sample currently used by three different treating companies along with the results using the sample 12-8816 from Example 1.

TABLE 1

Percent Breakout of Fracturing Fluid with Time

| | 1 min | 3 min | 4 min | 5 min | 10 min |
| --- | --- | --- | --- | --- | --- |
| Supplier A | 60 | 80 | 85 | 90 | 100 |
| Supplier B | 80 | 80 | 85 | 90 | 100 |
| Supplier C | 92 | 100 | | | |
| Sample 12-8816 | 100 | | | | |

The result demonstrate that the formulation of the present invention is superior to those currently employed by three treating companies in addition to being environmentally safe, green and biodegradable.

Example 3

Effect of the Flowback Aid on Regained Permeability at Various Residual Fluid Saturation FIG. 1 demonstrates the relative permeability at various residual fluid saturation with and without sample 12-8816. 0.1% by weight of the sample 12-8816 was added in 2% KCl and test against 2% KCl by itself. The data showed that the regained permeability is doubled using the small amount of sample 12-8816.

Example 4

Effect of the Flowback Aid on Regained Permeability at Various Gas Drive Pressure FIG. 2 demonstrates the regained permeability at various gas drive pressure. Again, 0.1 weight % of the sample 12-8816 was added to 2% KCl and tested against 2% KCl by itself. The data showed much higher regained permeability using 0.1% sample 12-8816.

Example 5

Low Freeze Formulation

A low temperature version of Example 1 was prepared by replacing 50% of the water with glycerin as a pour point depressant. This formulation was found to have the same performance characteristics as samples formulated without glycerin but remained fluid down to −41° F.

What is claimed:

1. An environmentally safe, green, non-toxic flowback aid composition derived from renewable resources including:
    a. one or more water soluble esters of a low molecular weight alcohol and a low molecular weight organic acid,
    b. One or more oil soluble esters of a low molecular weight alcohol and a high molecular weight fatty acid,
    c. one or more water soluble or dispersible nonionic surfactant(s) derived from vegetable or animal sources,
    d. one or more anionic or amphoteric surfactant(s) derived from animal or vegetable based sources, and,
    e. an aqueous carrier.

2. The environmentally safe, green, non-toxic flowback aid composition from renewable resources disclosed in claim 1 where the amount of one or more water soluble esters of low molecular weight alcohol and low molecular weight organic acid is 5 to 25 percent by weight.

3. The environmentally safe, green, non-toxic flowback aid composition from renewable resources disclosed in claim 1 where the amount of one or more oil soluble esters of low molecular weight alcohol and high molecular weight fatty acid is 5 to 25 percent by weight.

4. The environmentally safe, green, non-toxic flowback aid composition from renewable resources disclosed in claim 1 where the amount of one or more water soluble or dispersible nonionic surfactant(s) derived from vegetable or animal sources is 5 to 25 percent by weight.

5. The environmentally safe, green, non-toxic flowback aid composition from renewable resources disclosed in claim 1 where the amount of one or more anionic or amphoteric surfactant(s) derived from animal or vegetable based sources is 5 to 25 percent by weight.

6. The environmentally safe, green, non-toxic flowback aid composition from renewable resources disclosed in claim 1 where the aqueous carrier is selected from the group consisting of: water, brine, KCl solution, NaCl solution, any aqueous carrier used in fracturing.

7. A process for increasing flowback where the flowback composition described in claim 1 is added to a fracturing formulation at concentrations of 0.1 to 5 gallons per 1000 gallons of injection fluid.

8. An environmentally safe, green, non-toxic flowback aid composition derived from renewable resources including:
   a. one or more water soluble esters of a low molecular weight alcohol and a low molecular weight organic acid,
   b. One or more oil soluble esters of a low molecular weight alcohol and a high molecular weight fatty acid,
   c. one or more water soluble or dispersible nonionic surfactant(s) derived from vegetable or animal sources,
   d. one or more anionic or amphoteric surfactant(s) derived from animal or vegetable based sources,
   e. one or more environmentally safe freeze point depressants, and,
   f. an aqueous carrier.

9. The environmentally safe, green, non-toxic flowback aid composition from renewable resources disclosed in claim 8 where the amount of one or more water soluble esters of low molecular weight alcohol and low molecular weight organic acid is 5 to 25 percent by weight.

10. The environmentally safe, green, non-toxic flowback aid composition from renewable resources disclosed in claim 8 where the amount of one or more oil soluble esters of low molecular weight alcohol and high molecular weight fatty acid is 5 to 25 percent by weight.

11. The environmentally safe, green, non-toxic flowback aid composition from renewable resources disclosed in claim 8 where the amount of one or more water soluble or dispersible nonionic surfactant(s) derived from vegetable or animal sources is 5 to 25 percent by weight.

12. The environmentally safe, green, non-toxic flowback aid composition from renewable resources disclosed in claim 8 where the amount of one or more anionic or amphoteric surfactant(s) derived from animal or vegetable based sources is 5 to 25 percent by weight.

13. The environmentally safe, green, non-toxic flowback aid composition from renewable resources disclosed in claim 8 where the aqueous carrier is selected from the group consisting of water, brine, KCl solution, NaCl solution, any aqueous carrier used in fracturing.

14. The environmentally safe, green, non-toxic flowback aid composition from renewable resources disclosed in claim 8 where the one or more environmentally safe freeze point depressants is glycerin.

15. A process for increasing flowback where the flowback composition described in claim 8 is added to a fracturing formulation at concentrations of 0.1 to 5 gallons per 1000 gallons of injection fluid.

* * * * *